United States Patent [19]

Connor, Jr.

[11] 4,364,825
[45] Dec. 21, 1982

[54] LIQUID FILTER

[75] Inventor: Augustus S. Connor, Jr., Gastonia, N.C.

[73] Assignee: Wix Corporation, Gastonia, N.C.

[21] Appl. No.: 231,050

[22] Filed: Feb. 3, 1981

[51] Int. Cl.³ ............................................. B01D 35/02
[52] U.S. Cl. .................................. 210/109; 210/121; 210/416.4; 210/430
[58] Field of Search ............... 210/799, 119, 121, 123, 210/416.4, 430, 440, 443, 444, 109

[56] References Cited

U.S. PATENT DOCUMENTS 4,053,405 10/1977 DeKeyser et al. .................. 210/430

Primary Examiner—Ivars C. Cintins
Attorney, Agent, or Firm—Shoemaker and Mattare, Ltd.

[57] ABSTRACT

A liquid filter unit can be used to filter fuel and includes a ball which is moved into a position to prevent further fuel flow through the filter unit when a predetermined amount of water is collected in the unit. One form of the unit includes a water soluble membrane anchoring the ball in place. This form of the filter unit can be used in either the vertical or horizontal orientation, and can be used for high fluid flow rates.

13 Claims, 9 Drawing Figures

LIQUID FILTER

BACKGROUND OF THE INVENTION

The present invention relates in general to filter units, and, more particularly, to fuel filter units.

Ideally, there should be little or no water present in the fuel used to operate an internal combustion engine. However, it is extremely difficult to remove all water from such fuel, and eventually the cost of removing such water exceeds the benefits derived from such removal.

Internal combustion engines can operate on fuel containing small amounts of water; however, as above-discussed, there is an upper limit of water content whereat the engine will no longer operate or will be subject to damage by such water-containing fuel. At such point the engine should be shut down as quickly as is safely possible.

This above-discussed problem has engendered many devices meant to prevent water-containing fuel from reaching internal combustion engines. Examples of these devices are disclosed in U.S. Pat. Nos.: 3,385,440, 3,542,194, 4,053,405, and 4,132,646.

While effective, the devices disclosed in the above-cited patents have several drawbacks. Principal among these drawbacks is the inability of these devices to be adapted for use in flow situations wherein the fluid being filtered flows through the filter unit in turbulent flow or in transition flow conditions. Furthermore, these devices must be oriented vertically to work, and there is still a distinct possibility of water bypassing the blocking means, especially when the water level approaches the level selected as the maximum allowable level.

SUMMARY OF THE INVENTION

The device embodying the teachings of the present invention effectively prevents water from bypassing the filter unit and is adaptable for use in high flow rate and/or non-vertical orientation situations.

The filter unit disclosed herein includes an outlet port blocking means located at one end of the unit with the outlet port of the unit being located at the other end of the unit. While the present disclosure is directed to a fuel filter unit, it is understood that this unit can also be used in connection with other fluids, such as hydraulic fluids, or the like, or to fluid handling equipment other than internal combustion engines, or the like, without departing from the scope of the present invention.

In one embodiment, the blocking means includes a ball which floats in water but does not float in the fuel being filtered.

In another embodiment, the blocking means includes a ball which need not be floatable in water. The ball in this embodiment is held in place by a mooring means which includes a water soluble membrane. The membrane properties, such as thickness thereof, the solubility thereof, or the like, are selected so the membrane dissolves sufficiently to free the ball when the amount of water collected in the unit reaches a predetermined level. The velocity of the flow through this device is sufficient to cause the ball to be carried by that flowing fluid toward the unit outlet port. The ball will then block the outlet port to prevent further fuel flow to an engine.

Various elements can be included with any or all of these devices for draining the collected water so the unit can be reused, for diverting fluid flow to desired locations, and for permitting reduced engine operation after blocking means actuation, whereby a vehicle can be driven off the roadway, or the like.

OBJECTS OF THE INVENTION

It is the main object of the present invention to prevent engine operation using fuel containing substantial amounts of water.

It is another object of the present invention to filter a fuel in a high flow situation.

It is a further object of the present invention to filter fuel in situations wherein the filter unit is not vertically oriented.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
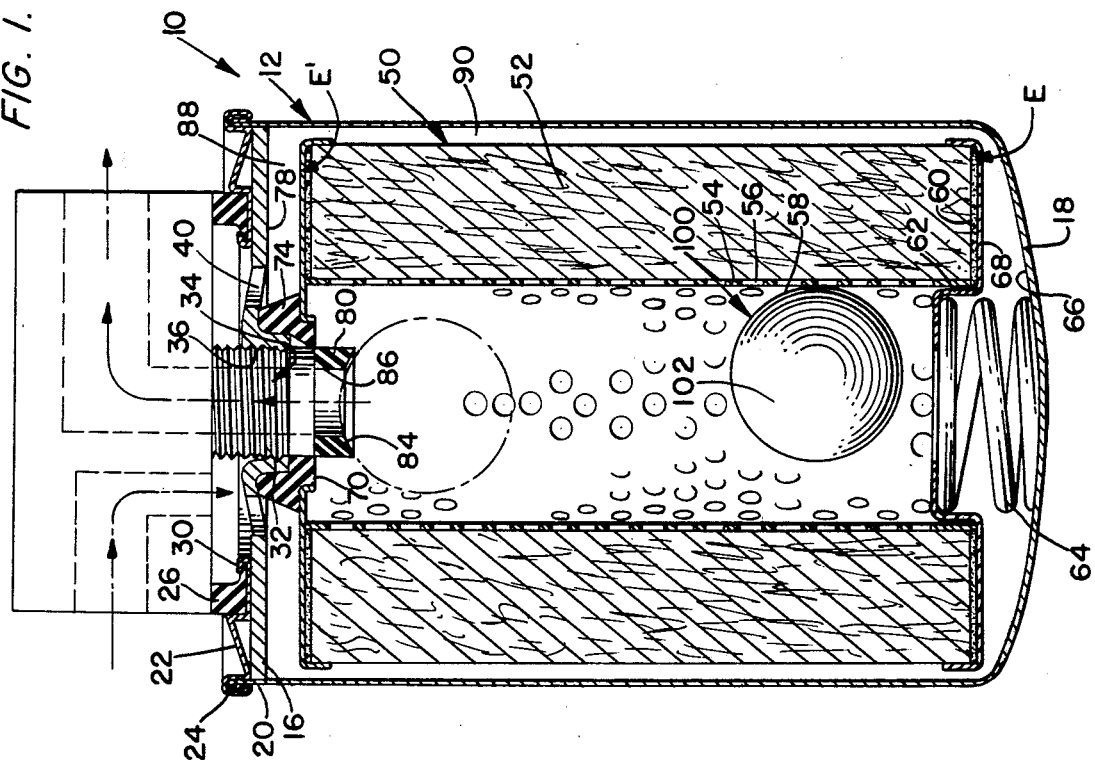
FIG. 1 is an elevation view of a filter unit embodying the teachings of the present invention.

Shown in FIG. 1 is a filter unit 10 embodying the teachings of the present invention attached to a filter base FB. The unit 10 includes a housing 12 having a wall 14 and a sheet metal top 16 affixed thereto at one end thereof. The other end 18 of the housing is arcuate. Plate 16 is affixed at peripheral edge 20 thereof to be attached to the housing wall, and a filter housing cover 22 is also attached to the wall 12 by double seaming 24. An annular gasket 26 is affixed to the cover 22 by crimps 30, or the like.

A boss 32 is defined centrally of the plate 16 and has a bore 34 defined thereby with threads 36 defined internally thereof. The boss extends downwardly into the interior of the housing 12 to have the longitudinal axis thereof aligned with the longitudinal axis of the housing. A plurality of ports 40 are defined in the plate 16 to surround the boss 32 and to be inwardly circumjacent the annular gasket 26 for fluidly connecting the interior of the housing with a connecting means attached to the unit 10. Such connecting means will be known to those skilled in the art based upon this disclosure, and no further discussion thereof will be presented. Such a connecting means can be used in fuel lines for internal combustion engines, or the like. The fluid ports 40 are the inlet ports for the filter unit 10, as will be discussed below.

A filter element 50 is located within the housing and includes an elongate annular filter medium 52 having a tubular perforated inner casing 54 with a multiplicity of fluid flow holes 56 defined therein. A central bore 58 is defined by the tubular perforated member, and has the longitudinal centerline thereof aligned with the longitudinal centerline of the housing and the boss 32. Sheet metal end discs E and E' are affixed to the ends of the filter medium casing. End disc E includes an annular peak 60 and a circular valley 62 which defines a spring seat to accommodate a retainer spring 64 which is seated on inner surface 66 of the housing end 18 and on outer surface 68 of the end disc E to urge the filter casing toward the housing top.

The end disc E' has a central opening 70 defined therethrough to be aligned with the boss 32. A sealing washer 74 is interposed between the end disc E' and inner surface 78 of the top 16. The spring 64 urges the filter forward against the washer 74 which is seated in the opening 70 of the end disc E to securely mount the filter 50 within the housing 12.

A tubular projection 80 is mounted at one end thereof on the sealing washer to extend into the bore 58 of the filter element 50. The other end of the projection is undercut to define a valve seat 84 for a purpose to be discussed below. The projection has a bore 86 defined longitudinally thereof to be aligned with the bore 58 of the filter. The bore 86 defines an exit port for the bore 58 so that the fluid path through the filter unit 10 includes the inlet ports 40, end space 88 between end disc E and cap 16, annular space 90 between the filter medium and the container wall 12, the filter medium 52, fluid flow holes 56, bore 58, bore 86 and any fluid connection (not shown) mounted in the bore 34 of the boss 32.

The unit 10 is preferably used as a fuel filter in internal combustion engines, and such fuel may have water therein. As above-discussed, such water is detrimental to engine performance and should be prevented, as much as possible, from reaching such engine. As was discussed above, small amounts of water can be tolerated by most engines without unduly affecting engine performance. The device embodying the teachings of the present invention blocks fluid flow through filter unit 10 when too much water may reach the engine. The amount of water required to effect this blocking can be determined according to the needs of the engine, and the like, and the method of effecting this determination will occur to those skilled in the art based on the teachings of the present disclosure.

A water triggered fluid flow blocking means 100 includes a float 102 positioned in the bore 58 of the filter medium. As shown in FIG. 1, one embodiment of the present invention includes a spherical ball as the float 102. The float 102 is constructed of material which floats in water but not in the fuel being filtered by the unit 10. For example, if the fuel being filtered is gasoline, the float 12 can be designed to float in liquid having a specific gravity of about 1.00, but not in a fluid having a specific gravity of about 0.88 or less. Such a material is polypropylene.

Thus, as can be seen from the foregoing, when the unit 10 is vertically oriented with the end 18 forming the bottom thereof, as fluid passes through the above-discussed flow path, water will collect at the bottom of the unit and the ball 102 will begin to float upwardly toward the exit port of the filter as more water is collected. When the amount of water collected in the filter is sufficient to detrimentally affect the engine performance, the ball 102 will be raised high enough to seat against the valve seat 84 to prevent further fluid flow through the filter unit 10. Fuel flow to an engine is thus shut off before too much water is present in the fuel downstream of the unit 10.

As can be seen from the foregoing, the size of the float 102 with respect to the length of the bore 58 can be selected to block further fluid flow through the unit 10 at any level of the water. Once the predetermined amount of water is collected in the unit 10 and the float blocks the exit port thereof, further engine operation is prevented.

As can also be seen from the above, the unit 10 is intended to be used in a vertical orientation. Furthermore, the unit 10 is intended to be used when fuel flow through that unit is laminar so that the float is moved by a buoyancy effect rather than a fluid turbulence effect.

As the unit prevents further fluid flow when the water level therein reaches the predetermined level, a vehicle operating on a road is abruptly shut off. Such a situation, while desirable from the standpoint of engine protection, is not entirely satisfactory from the standpoint of road safety. Accordingly, a compromise unit will permit just enough fuel flow through that unit to permit a vehicle to move off the road, but will not permit enough fuel to flow through the unit to allow full operation of the engine. Some engine protection is sacrificed in deference to road safety.

Figure 2:
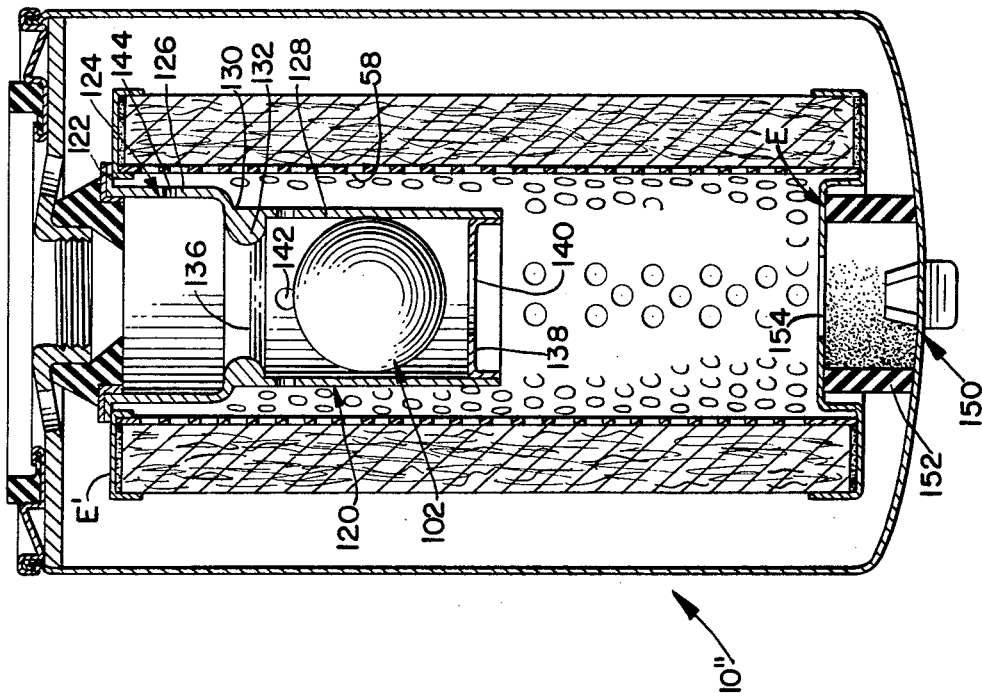
FIG. 2 is an elevation view of an alternative embodiment of the filter unit shown in FIG. 1.
Figure 1A:
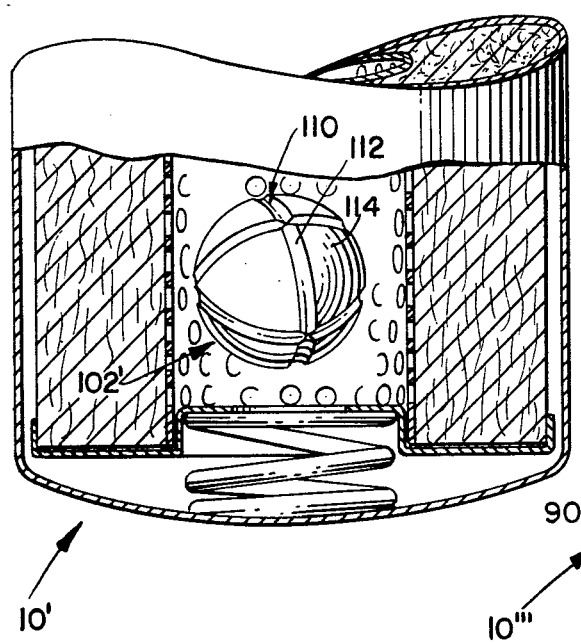
FIG. 1A is a partial elevation of an alternative embodiment of the filter unit shown in FIG. 1.

Such compromise units are shown in FIGS. 1A and 2. As shown in FIG. 1A, a unit 10' includes a float 102' having a fluid bypass path 110 defined thereon. The float ball 102' has a groove 112 defined therearound on the surface 114 thereof. The groove 112 forms a path through which fluid can pass to circumvent the ball and to pass into the exit port and thence into an engine.

A unit 10" is shown in FIG. 2 to include a sleeve 120 attached to the end disc E' to depend therefrom into the bore 58. The sleeve is unitary and includes an annular flange 122 mounted on the end disc E' and attached to a body 124 of the sleeve. The body includes a top portion 126 and a bottom portion 128, with the bottom portion being smaller in diameter than the top portion so that a neck 130 is defined at the junction of the top and bottom portions. A projection 132 is located at the neck and projects into bore 136 of the sleeve to form a constriction at the neck of the sleeve. An insert 138 is mounted in the lower end of the sleeve so that the sleeve bottom portion forms a cage in which the float 102 is located.

A fluid rise hole 140 is defined in the insert to fluidly connect the bore of the sleeve with filter medium bore 58, and main flow holes 142 are defined in the sleeve, with bypass holes 144 being defined in the sleeve top portion to permit a vehicle to run even after the float blocks flow as above-discussed with regard to unit 10'. Preferably, there are four main flow holes 142 which are located 90° apart.

The float 102 is free to move in the cage and will block fluid flow when water within the unit reaches a level sufficient to force the ball 102 against the neck projection 132 to block the fluid path to the unit outlet port.

As shown in FIG. 2, a drain 150 is included with the unit 10" so that the unit can be reused after cleanout. The drain 150 includes a spring tube 152, which is substituted for the retainer spring 64, and a drain hole 154 is defined in the end disc E. It is noted that drain 150 can be used on the units 10 and/or 10' if so desired, or the unit 10" need not have such drain unit without departing from the scope of the present disclosure.

The units 10, 10' and 10" are used in an upright orientation when flow past the float will be laminar. When such situations are not present, other forms of the filter unit can be used. Such a form is shown in FIGS. 3-6 and is denoted by the reference indicator 10'''.

Figure 3:
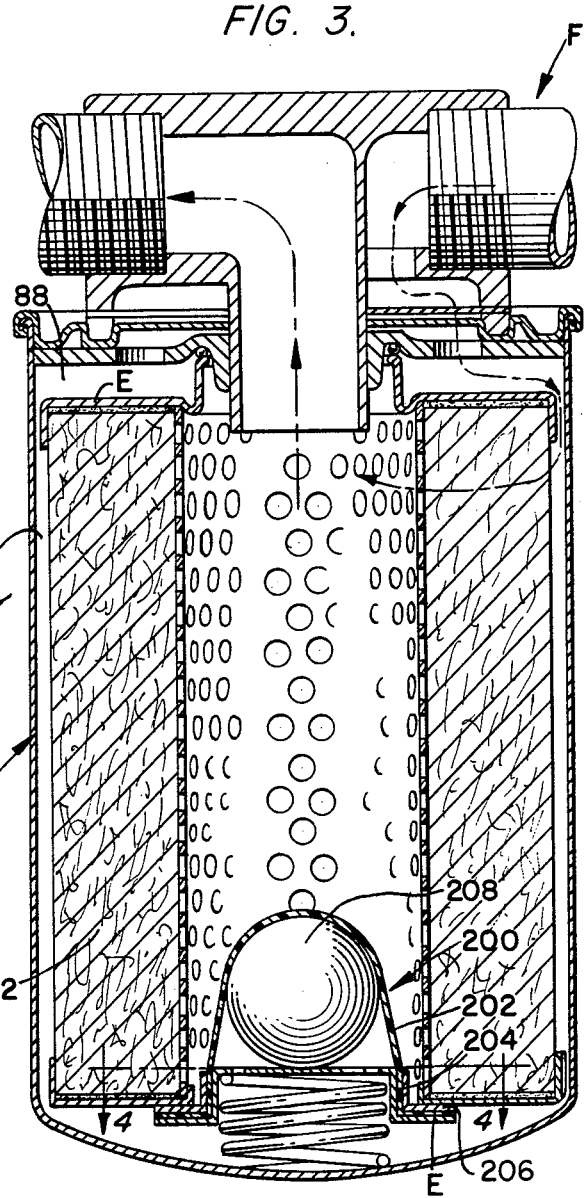
FIG. 3 is an alternative embodiment of the filter unit embodying the teachings of the present invention.

As shown in FIG. 3, the unit 10''' is similar to the unit 10, and is attached to a fuel line F to filter fuel flowing therethrough.

However, the unit 10''' includes a blocking unit 200 comprising a mooring means 202. The mooring means shown in FIG. 3 includes a flexible water soluble membrane, such as PVA film, or the like, and an annular collar 204 sandwiched between the end disc E and a retainer insert 206. The film is sandwiched between the collar and the retainer insert to be securely held thereby.

A blocking ball 208 is held in the FIG. 3 position by the mooring means. As above-stated, the mooring means is water soluble, but is not fuel soluble, and is designed to dissolve in a prescribed manner. The membrane is designed to dissolve sufficiently to release the ball when the water level within the unit 10''' reaches a level which will present a danger to the engine if fuel flow is not interrupted.

The ball 208 can float in water in a manner similar to ball 102; however, the preferred form of the unit 10''' has a ball which does not float, but which is carried toward the exit portion of the unit by fluid flowing through the unit. Thus, the unit 10''' will be used in situations where fluid flow is in the transition or turbulent ranges. Furthermore, the unit 10''' will preferably be used in orientations where that unit is not vertical.

Figure 4:
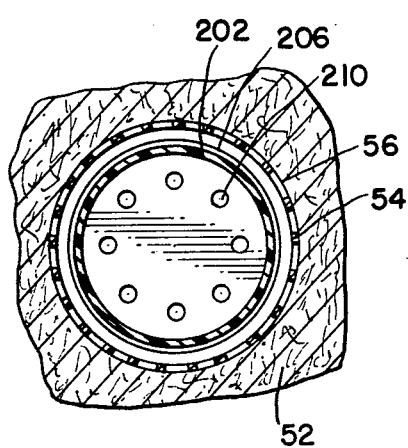
FIG. 4 is a view taken along line 4—4 of FIG. 3.

As best shown in FIG. 4, flow holes 210 are defined in the insert retainer to permit liquid to fill the volume around the blocking ball. As is also shown in FIG. 4, the retainer insert does not cover the entire end of the filter medium, or alternatively, has flow holes defined therein. A fluid flow path is thus defined whereby some of the fluid flowing into the unit 10''' will fill the volume around the blocking ball and thus bias the ball against the mooring means and will also bias the mooring means itself. This bias assists the release of the blocking means.

Figure 6:
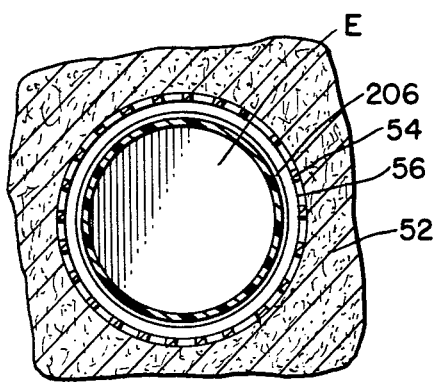
FIG. 6 is a view taken along line 6—6 of FIG. 5.
Figure 5:
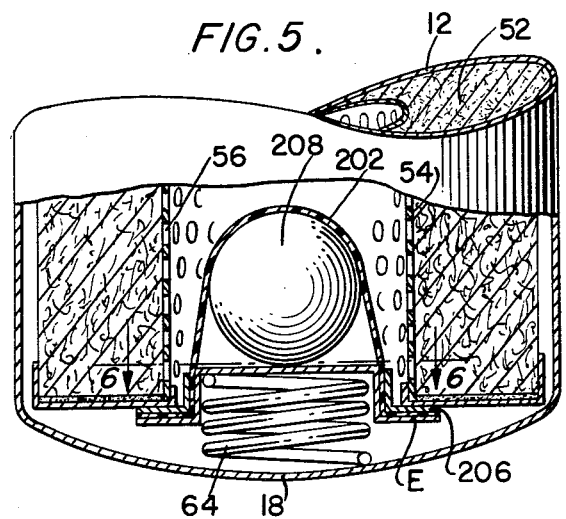
FIG. 5 is a partial elevation of an alternative embodiment of the filter unit shown in FIG. 3.

An alternative form of the mooring means is shown in FIGS. 5 and 6 wherein no flow holes are defined in the insert 206.

Figure 8:
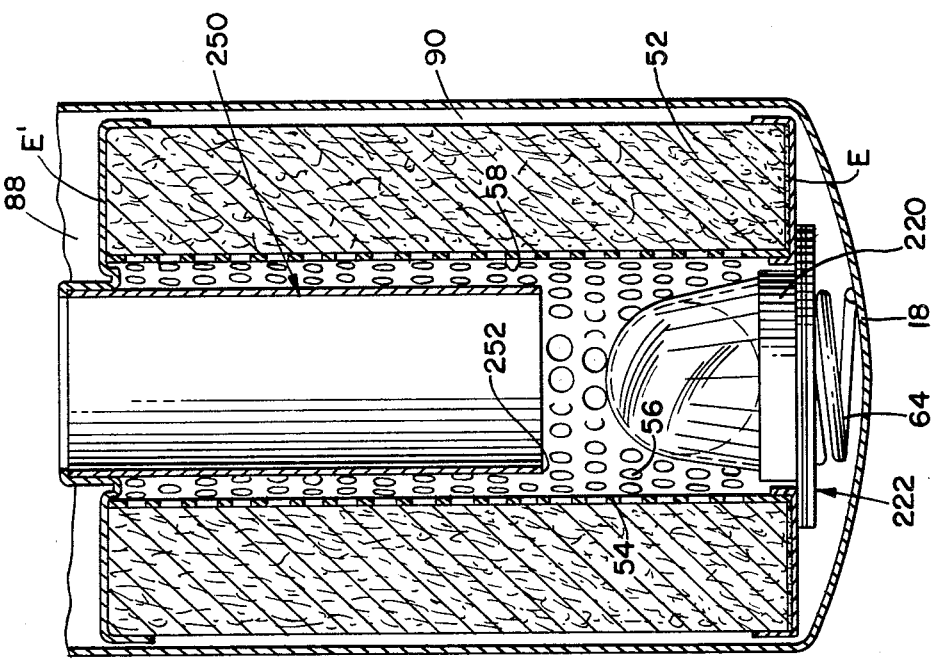
FIGS. 7–9 are elevation views of alternative embodiments of the filter unit shown in FIG. 3.
Figure 7:
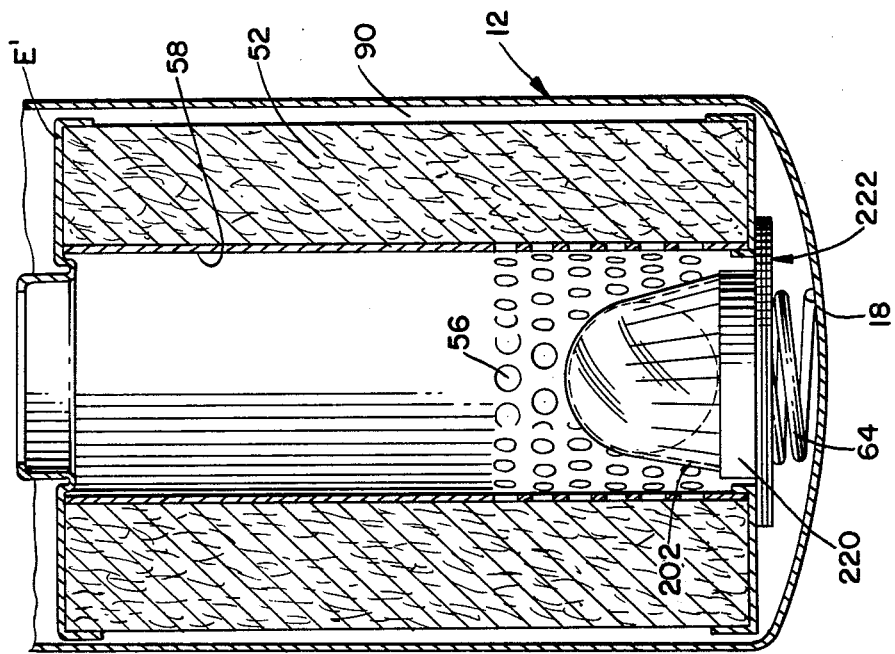
Figure 9:
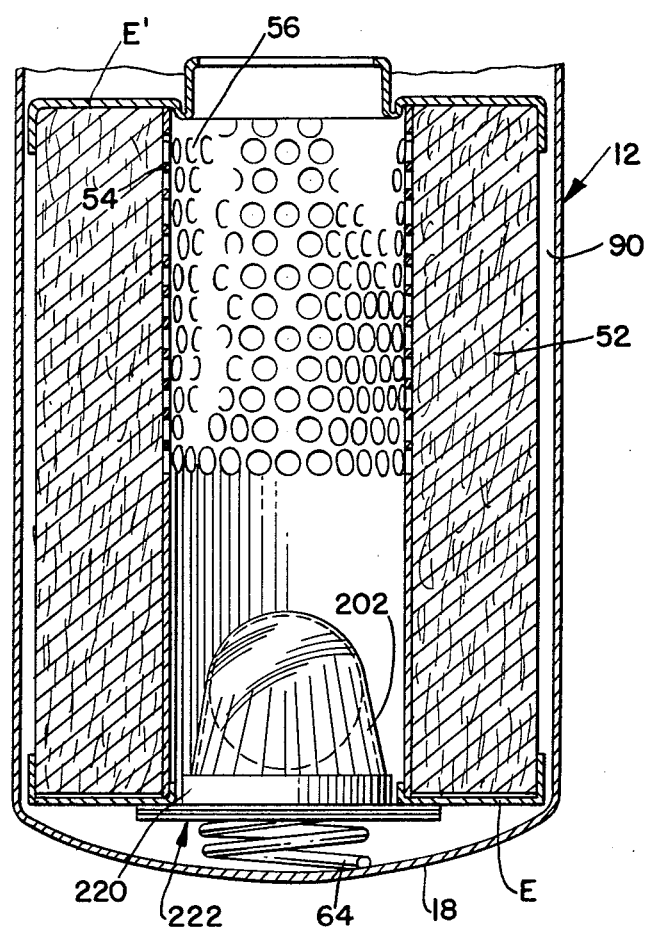

FIGS. 7-9 show alternative forms of the unit 10''', and attention is directed thereto. All of these forms include a collar member 220 which anchors the mooring film in place and a spring plate 222 which mounts the collar and sandwiches that collar against the filter end disc. A retainer spring 64 is used in all of these embodiments.

Flow holes are defined in the lower one-third of the filter medium inner bore in the FIG. 7 embodiment, and in the upper one-half of that bore in the FIG. 9 embodiment. Other fractions of the length can be used if so desired. The FIG. 7 embodiment forces flow past the blocking means, and the FIG. 9 embodiment permits the settling of water around the blocking means. Furthermore, the FIG. 9 embodiment can be used where the fuel itself may unduly weaken the mooring means, such as, for example, when PVA film is used in a filter unit which will filter gasahol, or the like.

A standpipe 250 is included in the FIG. 8 embodiment. The standpipe forces flow past the blocking means and can be mounted to adjust the amount of time it takes for the ball to cut off flow through the unit. The ball will seat on end 252 of the standpipe to shut off flow through the unit. Small bypass holes can be defined in the standpipe to permit continued engine operation at a reduced speed after actuation of the blocking means, as above-discussed.

While not shown, the ball 208 can include grooves similar to the grooves shown in FIG. 1A to permit continued engine operation at a severaly reduced rate as discussed above. Drain means can also be included in the FIGS. 3-9 embodiments.

The FIGS. 3-9 embodiments can be used in fuel pumping devices, or in conjunction with fuel storage tanks, or the like. If the devices are used with storage tanks, the fuel can be pumped from the device to an intermediate tank which can be refiltered after the present device has cut off so that any water which may bypass the filter immediately prior to cutoff is removed. Such a system will provide fuel having a very low percentage of water therein.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A device for filtering fluid comprising:
an elongate housing having an inlet and an outlet, both of which are situated at one end of said housing, said outlet having a main opening therein through which fuel flows;
an annular elongate filter means in said housing, said filter means having a bore defined longitudinally therethrough and positioned in said housing to be interposed between said housing inlet and outlet and to have said bore in fluid communication with said outlet;
outlet blocking means located within said filter means bore and positioned to be in alignment with said outlet main opening, said outlet blocking means being composed of a material which floats in water but does not float in the fluid being filtered and being located to be lodged against said outlet main opening to prevent fuel from passing into said main opening when a predetermined amount of water has been collected in said housing, said outlet blocking means being sized and positioned to permit essentially full flow of fuel into said main opening until said predetermined amount of water has been collected in said housing, then to block said main opening essentially immediately when said predetermined amount of water has been collected so that an on-off action occurs.

2. The device defined in claim 1 further including mooring means attaching said outlet blocking means to said housing.

3. The device defined in claim 2 further including bypass means on said mooring means for permitting some fluid to flow into said outlet when said outlet blocking means is in said blocking position.

4. The device defined in claim 2 wherein said mooring means includes a sleeve attached to said housing adjacent said outlet.

5. The device defined in claim 1 further including bypass means on said float means for permitting some fluid to flow into said outlet when said outlet blocking means is in said blocking position.

6. The device defined in claim 1 further including drain means on said housing for removing water collected in said housing.

7. A device for filtering fuel comprising:
an elongate housing having an inlet and an outlet, both of which are situated at one end of said housing;
an annular elongate filter means in said housing, said filter means having a bore defined longitudinally therethrough and positioned in said housing to be interposed between said housing inlet and outlet and to have said bore in fluid communication with said outlet;
outlet blocking means located within said filter means bore and positioned to be in alignment with said outlet, said outlet blocking means being located to be moved into a position to occlude said outlet when a predetermined amount of water has been collected in said housing; and
mooring means attaching said outlet blocking means to said housing, said mooring means including water soluble means which dissolves sufficiently to release said outlet blocking means when a predetermined amount of water is collected in said housing, a released outlet blocking means being carried into a position to occlude said outlet by fluid flowing through said filter means toward said outlet so that said filter means can be oriented either horizontally or vertically and fluid flow through said filter means can be turbulent.

8. The device defined in claim 7 wherein said mooring means includes a PVA film.

9. The device defined in claim 7 further including flow ports fluidly connecting said mooring means with fluid flowing from said filter means in a manner which applies releasing bias on said mooring means.

10. The device defined in claim 7 further including a conduit attached at one end thereof to said outlet and having another end thereof located adjacent said blocking means.

11. The device defined in claim 7 further including a multiplicity of flow ports defined in said filter means bore.

12. The device defined in claim 11 wherein said flow ports are only in that portion of said bore located adjacent said mooring means.

13. The device defined in claim 11 wherein said flow ports are only in that portion of said bore located adjacent said outlet.

* * * * *